Sept. 25, 1934.  J. F. LEVENTHAL  1,974,573
OPTICAL COMPENSATING SYSTEM
Filed June 25, 1931   2 Sheets-Sheet 1
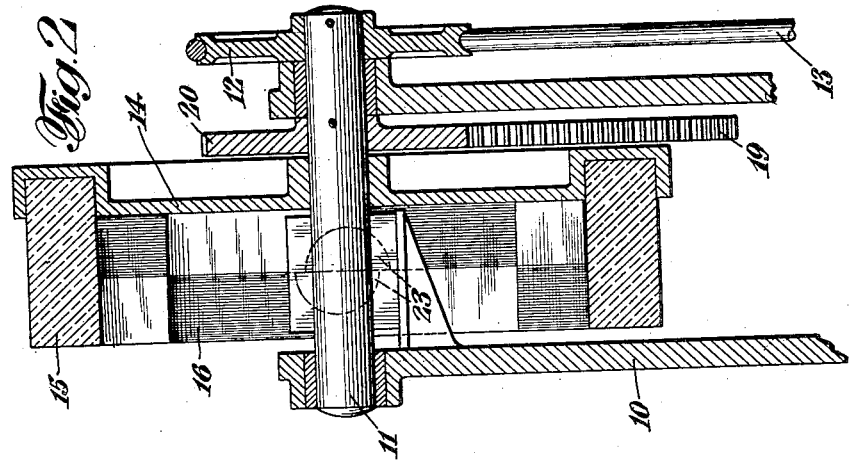
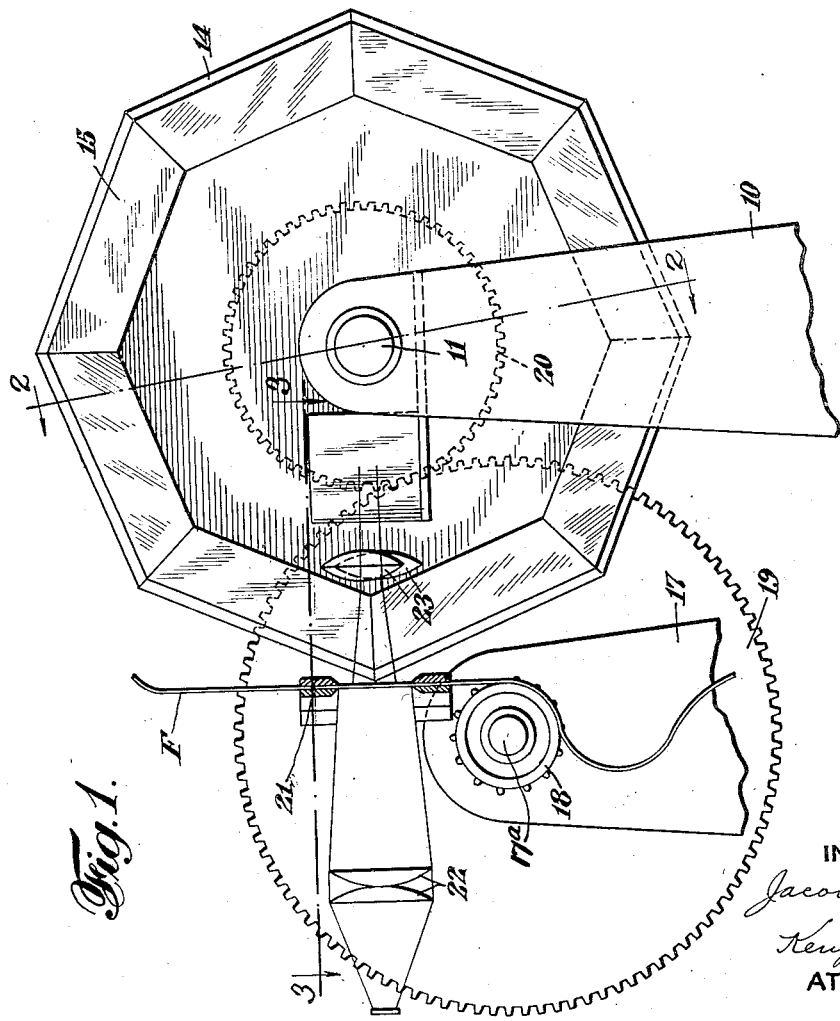
INVENTOR
Jacob F. Leventhal
Kenyon & Kenyon
ATTORNEYS Sept. 25, 1934.   J. F. LEVENTHAL   1,974,573
OPTICAL COMPENSATING SYSTEM
Filed June 25, 1931   2 Sheets-Sheet 2
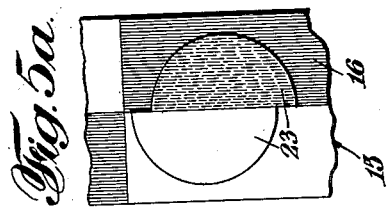
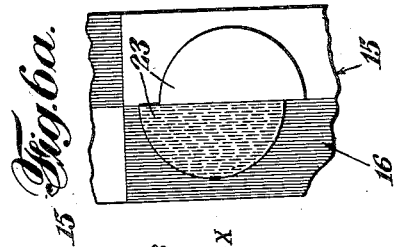
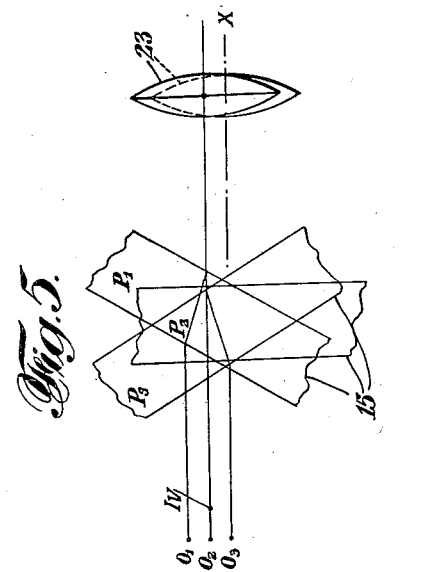
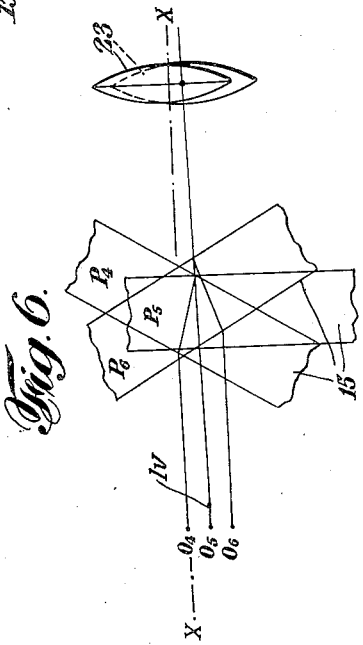
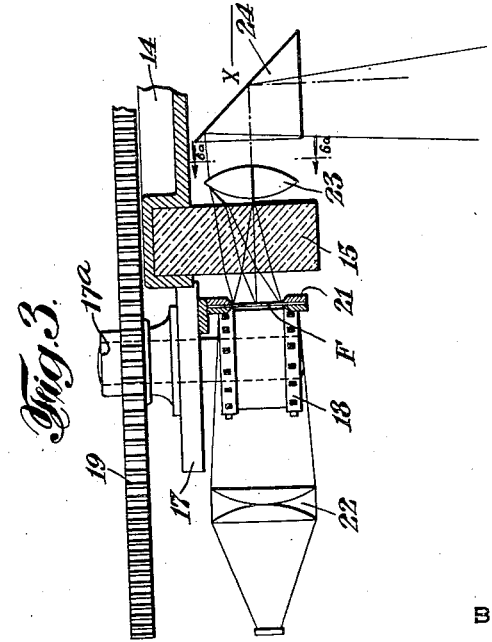
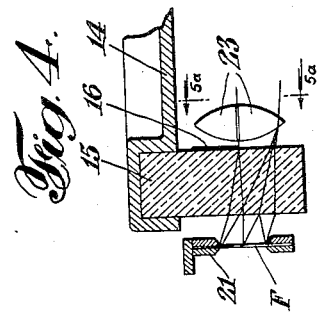
INVENTOR
Jacob F. Leventhal
BY   ATTORNEYS
Kenyon & Kenyon Patented Sept. 25, 1934

1,974,573

UNITED STATES PATENT OFFICE 1,974,573

OPTICAL COMPENSATING SYSTEM

Jacob F. Leventhal, New York, N. Y.

Application June 25, 1931, Serial No. 546,791

18 Claims. (Cl. 88—16.8)

This invention relates to motion picture apparatus and more especially to an optical compensating system for producing stationary images of pictures on a film advanced at uniform rate of speed.

In some systems, the optical compensator used for this purpose is composed of plane-parallel refracting means which are rotated about an axis in synchronism with the linear movement of the film. Such compensators produce various kinds of objectionable aberrations, the magnitude of which increases with the compensation effected in each compensating cycle. It is an object of this invention to so reduce in magnitude the aberrations produced by such optical compensators as to make them unobjectionable.

According to the invention, the refracting means compensates each picture in a plurality of successive stages and separate stationary optical channels are provided to cooperate in succession with the refracting means to produce successive coextensive stationary images of the picture. The magnitude of the aberrations is related to the compensation effected in each stage rather than to the compensation of the entire picture and is therefore so reduced as to be unobjectionable.

Other objects, novel features and advantages of this invention will be apparent from the following specification and accompanying drawings, wherein:

Fig. 1 is a side elevation partly in section of one type of compensating means embodying the invention.

Fig. 2 is a section substantially on the line 2—2 of Fig. 1.

Fig. 3 is a fragmentary section substantially on the line 3—3 of Fig. 1 during the first compensating stage.

Fig. 4 is a fragmentary section similar to Fig. 3 during the second compensating stage, and Figs. 5 and 6 are diagrammatic views illustrating the principles of operation of the device.

Figs. 5a and 6a are fragmentary sections taken respectively on the lines 5a—5a of Fig. 4 and 6a—6a of Fig. 3.

A frame 10 supports a shaft 11 on which is mounted a driving pulley 12 over which is passed the driving belt 13. A holder 14 is fixed to the shaft 11 and supports a plurality of plane-parallel refracting members 15 symmetrically arranged with respect to the axis of rotation. The inner face of each refracting member 15 is half-covered with opaque material as at 16, the opaque halves being alternately arranged with respect to a reference plane perpendicular to the axis of rotation. A second frame 17 rotatably supports a shaft 17a to which is fixed a sprocket 18 and a pinion 19 which meshes with a pinion 20 fixed to the shaft 11. Above the sprocket 18 there is provided a gate 21 through which motion picture film F is drawn by means of the sprocket 18. A condenser lens 22 is provided for directing a beam of light through the film and the refracting members 15. The gear ratio between the pinions 19 and 20 is such that the film is advanced through the height of one picture, while the holder 14 makes a fractional revolution equal to the ratio of two refracting members to the whole number. In this particular instance, the holder is provided with eight members so that it makes one quarter of a revolution while the film is being advanced one picture.

The passage of a refracting member across the optical axis of the apparatus constitutes a single compensating cycle, during which the refracting member produces a stationary virtual image of a film picture during half of a picture cycle, that is during half the movement of the film picture across the optical axis.

With this arrangement each picture is compensated in two stages, the first compensating stage being effected by one refracting member and the second compensating stage being effected by the following refracting member. Two spaced stationary virtual images of the film picture are thus successively produced, one above and the other below the optical axis.

Semicircular lenses 23 are provided for re-imaging the spaced stationary virtual images in registering alinement in a common image plane, one lens being arranged to re-image the virtual image produced during the first compensating stage and the other being arranged to re-image the virtual image produced during the second compensating stage. The lenses 23 are symmetrical with respect to the optical axis of the apparatus and have their optical axes parallel to the optical axis of the apparatus, the relation of said lenses being such that the images produced by them are in registering relation in the image plane. The alternate opaque faces of the refracting members 15 are effective to block out the lower lens 23 during the first compensating stage and the upper lens 23 during the second compensating stage so that light can pass from the film through a refracting member to the screen only by way of a single lens, thereby insuring correct placement of the real images on the screen. With this arrangement, one lens is blocked off during the first compensating stage and the other lens is blocked off during the second compensating stage, so that only successive images of the same picture are produced in the image plane during the two compensating stages. A prism 24 is provided for directing the optical path to a screen.

Fig. 3 discloses the action of the opaque shield of one refracting member during the first compensating stage and Fig. 4 discloses the operation of the opaque shield of the next refracting member during the second compensating stage. The images produced in the image plane during two stages are co-extensive and in registering alinement.

Fig. 5 discloses the compensating paths followed by the light beam axis at three different positions of a refracting member during the first compensating stage and during which the lens for producing the image during this stage is exposed to the light beam while the other lens is blocked out, (see Fig. 5a). The points $O_1O_2O_3$ indicate three positions of the center of a film picture during the first compensating stage and $P_1P_2P_3$ indicate corresponding positions of the refracting member which is effecting the compensation. The compensation produces of the points $O_1O_2$ and $O_3$ a stationary virtual image $I_v$ which lies above the optical axis X—X of the condenser lens 22, this axis being coincident with the main optical axis of the apparatus.

Fig. 6 discloses the compensating paths followed by the light beam axis at three different positions of a refracting member during the second compensating stage and during which the lens for producing the image during this stage is exposed to the light beam while the other lens is blocked out (see Fig. 6a). The points $O_4O_5O_6$ indicate three positions of the center of the film picture during the second compensating stage and $P_4P_5P_6$ indicate corresponding positions of the refracting member which is effecting the compensation. The compensation produces of the points $O_4,O_5$ and $O_6$ a stationary virtual image $I'_v$ which lies below the optical axis X—X.

The relation of the lenses 23 to the main optical axis and to each other is such that a secondary axis of one passing through its associated virtual image point and a secondary axis of the other passing through its associated virtual image point, meet at a common point in the final image plane. The real image points of the virtual image points are therefore in registration in the final image plane.

Referring to Figs. 5 and 6, rotation of the compensator through the first compensating cycle renders the center point of the film picture in any of its positions $O_1$, $O_2$ and $O_3$ and in intermediate positions, optically conjugate with the point $I_v$ (Fig. 5). Likewise, rotation of the compensator through the second compensating cycle renders the center point of the film picture, in any of its positions $O_4$, $O_5$ and $O_6$ and in intermediate positions, optically conjugate with the point $I'_v$ (Fig. 6). The points $I_v$ and $I'_v$ lie in a common plane parallel to the film plane and are arranged respectively above and below the optical axis XX. The half lenses 23 render the points $I_v$ and $I'_v$ optically conjugate with a point in the screen plane (not shown).

In the operation of this apparatus, a pair of refracting members is used to effect conpensation of each film picture. The first refracting member of a pair produces a stationary virtual image of the film picture above the optical axis and the second refracting member of the pair produces a second stationary virtual image below the optical axis, these virtual images being produced in succession. A real image of the film picture is formed from the first virtual image by one lens 23 and a real image of the film picture is formed from the second virtual image by the other lens 23. The arrangement of the lenses 23 is such that the real images formed thereby are in registering relationship, that is, each real image of the film picture lies in the same plane and bears the same relation to the optical axis of the projector as does the other real image of the film picture. During the time that the first refracting member of a pair is producing the first virtual image, the second lens is rendered ineffective by the shielded portion of the preceding refracting member and while the second refracting member is producing the second virtual image the first lens is rendered ineffective by the shielded portion of the succeeding refracting member.

Each picture is compensated in two stages and for each compensating stage there is provided an optical channel for producing an image of the compensated picture, the channels being so arranged that the images produced are co-extensive and lie in the same plane. The provision of means for alternately blocking the optical channels prevents the formation of more than one image during a compensating stage. By effecting the compensation in stages of magnitude of compensation required of each refracting member is only half that required for total compensation of the picture. As a result aberrations incident to the compensation are limited in magnitude to the aberrations produced by a single refracting member and are so small as to be unobjectionable.

While the above described apparatus discloses two stage compensation, it is to be understood that the compensation may be effected in a different number of stages. Also it is to be understood that the invention is not limited to the use of any particular number of refracting members in the compensator and that the use of a single refracting member as a compensator lies within the contemplation of the invention. Furthermore, it is apparent that various modifications may be made in the device herein described, without in any way departing from the spirit of the invention as defined in the appended claims.

I claim:

1. A motion picture apparatus comprising means for feeding film at uniform linear speed, movable optical compensating means, means to effect, during movement of the film through a single picture cycle, movement of the compensating means through N compensating cycles whereby a point on the moving film is rendered optically conjugate successively with each of N stationary spaced points in the direction of film travel and lying in a common plane, and means for establishing optical conjugacy between a stationary point and any one of said spaced points during conjugacy thereof with the moving film point.

2. A motion picture apparatus comprising means for feeding film at uniform linear speed, movable optical compensating means, means to effect, during movement of the film through a single picture cycle, movement of the compensating means through N compensating cycles whereby a point on the moving film is rendered optically conjugate successively with each of N stationary spaced points in the direction of film travel and lying in a common plane, N imaging means individually related to the spaced points and arranged to render optically conjugate said spaced points and a single stationary point, and means timed with the compensating means for rendering each imaging means effective only during its related compensation cycle.

3. A motion picture apparatus comprising means for feeding film at uniform linear speed, movable optical compensating means, means to effect during movement of the film through a single picture cycle, movement of the compensating means through N compensating cycles whereby a point on the moving film is rendered optically conjugate successively with each of N stationary spaced points in the direction of film travel and lying in a common plane, N lenses individually related to said spaced points and arranged to render optically conjugate said spaced points and a single stationary point, and means timed with the compensating means for rendering each lens effective only during its related compensating cycle.

4. A motion picture projector comprising means for feeding film at uniform linear speed, optical compensating means arranged and adapted, upon movement through a predetermined number of compensating cycles in timed relation with movement of the film through a single picture cycle, to produce successive stationary spaced images of a luminous point on the moving film, means for re-imaging said spaced images in registering alinement in a common image plane, and means for limiting operation of said last named means to a single image during each compensating cycle.

5. A motion picture projector comprising means for feeding film at uniform linear speed, rotatable plane parallel optical compensating means arranged and adapted, upon rotation through a predetermined number of compensating cycles in timed relation with movement of the film through a single picture cycle, to produce successive stationary spaced images of a luminous point on the moving film, means for re-imaging said spaced images in registering alinement in a common image plane, and means for limiting operation of said last named means to a single image during each compensating cycle.

6. A motion picture projector comprising means for feeding film at uniform linear speed, optical compensating means arranged and adapted upon movement through a predetermined number of compensating cycles in timed relation with movement of the film through a single picture cycle to produce successive stationary spaced images of a luminous point on the moving film, means for re-imaging said spaced images in registering alinement in a common image plane, and obturator means for masking off all but one of said re-imaging means during each compensating cycle.

7. A motion picture projector comprising means for feeding film at uniform linear speed, movable optical compensating means arranged and adapted upon movement through N compensating cycles in timed relation with movement of the film through a single picture cycle to produce N successive stationary spaced images of a luminous point on the moving film, imaging means for re-imaging said spaced images in registering alinement in a common image plane, said means including lenses having their optical axes spaced in the direction of film travel, each lens being individual to one of said spaced images, and means synchronized with said optical compensating means for rendering ineffective all but one of said lenses during each compensating cycle.

8. A motion picture projector comprising means for feeding film at uniform linear speed, movable optical compensating means arranged and adapted upon movement through N compensating cycles in timed relation with movement of the film through a single picture cycle to produce N successive stationary spaced images of a luminous point on the moving film, imaging means for re-imaging said spaced image in registering alinement in a common image plane, said means including lenses having their optical axes spaced in the direction of film travel, each lens being individual to one of said spaced images, and obturator means synchronized with said optical compensating means for masking off all but one of said lenses during each compensating cycle.

9. A motion picture projector comprising means for feeding film at uniform linear speed rotatable plane-parallel optical compensating means arranged and adapted upon rotation through two compensating cycles in timed relation with movement of the film through a single picture cycle to produce two successive stationary spaced images of a luminous point on the moving film, optical means for re-imaging said images in registering relation in a common plane, said means consisting of a pair of opposed half lenses having their optical axes spaced in the direction of film travel and having their contacting flat surfaces in alinement with the longitudinal median of the film, and obturator means synchronized with said compensating means for alternately rendering said half-lenses inoperative during successive compensating cycles.

10. A motion picture projector comprising means for feeding film at uniform linear speed, movable optical compensating means arranged and adapted, upon movement through N compensating cycles in timed relation with movement of the film through a single picture cycle, to produce N successive stationary spaced images of a luminous point on the moving film, N imaging means for reimaging said spaced images in registering alinement in a common image plane, each of said imaging means being individual to one of said spaced images, and means synchronized with said optical compensating means for rendering ineffective all but one of the said imaging means during each compensating cycle.

11. A motion picture projector comprising means for feeding film at uniform speed, rotatable plane parallel optical compensating means arranged and adapted upon rotation through N compensating cycles in timed relation with movement of the film through a single picture cycle, to produce N successive stationary spaced images of a luminous point on the moving film, N imaging means for re-imaging said spaced images in registering alinement in a common image plane, each of said imaging means being individual to one of said spaced images, and obturating means synchronized with said optical compensating means for rendering ineffective all but one of said imaging means during each compensating cycle.

12. A motion picture projector comprising means for feeding film at uniform linear speed, rotatable optical compensating means consisting of a plurality of contiguous plane parallel refracting members symmetrically arranged with respect to the axis of rotation, said compensating means being arranged and adapted, upon movement through N compensating cycles in timed relation with movement of the film through a single picture cycle, to produce N successive stationary spaced images of a luminous point on the moving film, N imaging means for re-imaging said spaced images in registering alinement in a common image plane, each of said imaging means being individual to one of said spaced images, and obturating means synchronized with said optical compensating means for rendering ineffective all but one of the said imaging means during each compensating cycle.

13. A motion picture projector comprising means for feeding film at uniform linear speed, rotatable optical compensating means consisting of a plurality of contiguous plane parallel refracting members symmetrically arranged with respect to the axis of rotation, said compensating means being arranged and adapted, upon rotation through N compensating cycles in timed relation with movement of the film through a single picture cycle, to produce N successive stationary spaced images of a luminous point on the moving film, N lenses for re-imaging said spaced images in registering alinement in a common image plane, each of said lenses being individual to one of said spaced images, and opaque material covering a portion of each refracting member, said opaque material being arranged to render ineffective all but one of said lenses during a compensating cycle.

14. A motion picture projector comprising a rotatable optical compensator comprising a plurality of contiguous plane parallel refracting members symmetrically arranged with respect to the axis of rotation, a light source for supplying a light beam to said compensator with its axis intersecting the rotational axis of said compensator, means to feed motion picture film across said light beam at uniform linear speed between said light source and compensator, means to rotate said compensator in timed relation to the linear movement of said film to cause the light beam axis to be traversed by a predetermined number of refracting members while being traversed by one film picture thereby producing in succession a corresponding number of stationary virtual images spaced in the direction of film travel, optical means individual to each virtual image for producing therefrom real images of said film picture in registering relation, and means synchronized with said compensator for rendering ineffective all but one of said last named optical means during the production of each virtual image of said film picture.

15. A motion picture projector comprising a rotatable optical compensator consisting of a plurality of contiguous plane parallel refracting members symmetrically arranged with respect to the axis of rotation, a light source for supplying a light beam to said compensator with its axis intersecting the rotational axis of said compensator, means to feed motion picture film across said light beam at uniform linear speed between said light source and said compensator, means to rotate said compensator in timed relation to the linear movement of said film to cause the light beam axis to be traversed by a pair of refracting members while being traversed by one film picture thereby producing in succession two stationary virtual images of each film picture spaced in the direction of film travel and optical means for re-imaging said virtual images in registering relation in a common plane, said means consisting of a pair of opposed half-lenses having their optical axes spaced from the light beam axis in the direction of film travel and having their contacting flat surfaces in alinement with the longitudinal median of the film, and means synchronized with said compensator for rendering ineffective all but one of said last named optical means during the production of each virtual image of said film picture.

16. A motion picture projector comprising a rotatable optical compensator consisting of a plurality of contiguous plane parallel refracting members symmetrically arranged with respect to the axis of rotation, a light source for supplying a light beam to said compensator with its axis intersecting the rotational axis of the compensator, means to feed motion picture film across said light beam at uniform linear speed between said light source and said compensator, means to rotate said compensator in timed relation to the linear movement of said film to cause the light beam axis to be traversed by a pair of refracting members while being traversed by one film picture, thereby producing in succession two virtual images of each film picture spaced in the direction of film travel, optical means for re-imaging said virtual images in registering relation in a common plane said means consisting of a pair of opposed half lenses having their optical axes oppositely spaced from the light beam axis in the direction of film travel and having their contacting flat surfaces in alinement with the longitudinal median of the film, and opaque material covering one-half of each refracting member, said opaque material being oppositely arranged on successive refracting members to render said lenses alternately ineffective during passage of a pair of refracting members across the light beam axis.

17. The method of projecting motion pictures which comprises feeding motion picture film at constant linear speed, producing successive stationary images of each picture spaced in the direction of film travel while the film is advanced a single picture and successively re-imaging said spaced images in registering relation in a common image plane.

18. The method of projecting motion pictures which comprises feeding motion picture film at constant linear speed, producing a stationary image of a film picture while the film is advanced one-half picture, producing a second stationary image of said picture spaced from the first image in the direction of film travel while the film is advanced the remainder of said picture and successively re-imaging said spaced images in registering relation in a common image plane.

JACOB F. LEVENTHAL.